United States Patent [19]

Wolff et al.

[11] Patent Number: 4,952,641
[45] Date of Patent: Aug. 28, 1990

[54] ORGANYLOXYSILYL-FUNCTIONAL THIOUREAS WITH HALOGEN RUBBER MIXTURES

[75] Inventors: Siegfried Wolff, Bornheim-Merten; Heinz Grewatta, Cologne, both of Fed. Rep. of Germany

[73] Assignee: Degussa Aktiengesellschaft, Frankfurt am Main, Fed. Rep. of Germany

[21] Appl. No.: 357,727

[22] Filed: May 26, 1989

[30] Foreign Application Priority Data

Jun. 25, 1988 [DE] Fed. Rep. of Germany ....... 3821463

[51] Int. Cl.$^5$ ...................... C08C 19/22; C08C 15/02
[52] U.S. Cl. .................. 525/332.7; 525/331.1; 525/333.9; 525/342; 548/110
[58] Field of Search ................ 525/331.1, 332.7, 333.9

[56] References Cited

U.S. PATENT DOCUMENTS

| 3,779,963 | 12/1973 | Ancker | 525/342 |
| 3,808,173 | 4/1974 | Orihashi | 525/342 |
| 3,978,103 | 8/1976 | Meyer-Simon | 525/342 |

Primary Examiner—Christopher Henderson
Attorney, Agent, or Firm—Cushman, Darby & Cushman

[57] ABSTRACT

Vulcanizable rubber mixtures which contain at least one halogen rubber, a silicatic filler and a substituted organyloxysilyl-functional thiourea as accelerator.

9 Claims, No Drawings

ORGANYLOXYSILYL-FUNCTIONAL THIOUREAS WITH HALOGEN RUBBER MIXTURES

The invention relates to vulcanizable halogen rubber mixtures containing a silicate filler, optionally mixed with carbon black, and containing at least one substituted organyloxysilyl-functional thiourea.

BACKGROUND OF THE INVENTION

It is known that a silane is necessary as a component of rubber mixtures which are vulcanizable with sulfur and contain a rather high portion of silicate fillers such as e.g. precipitated silicic acid, in order to impart sufficiently good properties to the vulcanizates.

Published German Patent Application DE-AS No. 23 19 638 describes how valuable vulcanization products are produced from rubber mixtures containing silicate fillers, halogen-containing rubber grades, and certain halogen-containing silanes.

Such mixtures frequently contain thioureas as vulcanization accelerator.

However, the latter, and also the breakdown products produced from them during vulcanization, are considered to be toxicologically hazardous. (Eholzer, Kempermann in "Gummi, Asbest, Kunststoffe" [Rubber, Asbestos, Plastics] 36 (1983), p. 9)

SUMMARY OF THE INVENTION

The present invention provides vulcanizable rubber mixtures containing at least one halogen rubber and a silicate filler, as well as at least one substituted trialkoxysilylfunctional thiourea of the general formula (I)

$$(RO)_{3-b}\overset{(CH_3)_b}{\underset{|}{Si}}-(CHX)_a-NR^1-CS-NR_2R_3 \qquad I$$

or of the general formula (II)

$$(RO)_{3-b}\overset{(CH_3)_b}{\underset{|}{Si}}-(CH_2)_n-N\overset{R^4}{\underset{\underset{\underset{S}{\|}}{C}}{\diagdown\diagup}}NR^1 \qquad II$$

in an amount of 0.5–5.0 phr (parts per hundred parts of rubber by weight) as accelerator, in which b represents 0, 1 or 2

R represents alkyl with 1 to 6 carbon atoms cycloalkyl with 5 to 7 carbon atoms aryl, especially phenyl X represents hydrogen, if $a = 1, 3, 4, 5$ or 6, or X represents $$-CH_2-\!\!\!\left\langle\!\!\!\bigcirc\!\!\!\right\rangle\!\!\!-CH_2-,$$

if $a = 1$ $R^1$ represents hydrogen $$-(CH_2)_3-\overset{Si(OR)_{3-b}}{\underset{|}{(CH_3)_b}}$$

$R^2$ represents hydrogen alkyl with 1 to 8 carbon atoms, alkenyl with 1 to 8 carbon atoms, aryl, especially phenyl, naphthyl, aralkyl, especially benzyl, phenethyl or $$-(CH_2)_3-\overset{Si(OR)_{3-b}}{\underset{|}{(CH_3)_b}}$$

$R^3$ which may be the same as or different from $R^2$ represents alkyl with 1 to 8 carbon atoms,
alkenyl with 1 to 8 carbon atoms,
aryl, especially phenyl, naphthyl, aralkyl, especially benzyl, phenethyl or $$-(CH_2)_3-\overset{Si(OR)_{3-b}}{\underset{|}{(CH_3)_b}}$$

$R^4$ represents alkylene with 1 to 4 carbon atoms, especially $-CH_2-CH_2-$, arylene, especially 1,2-phenylene n represents a whole number from 1 to 6, especially 1 or 3.

The compounds according to general formulas (I) and (II) are prepared according to the methods presented in German patent applications P 38 21 464.4 and P 38 21 465.2, and corresponding U.S. Applications of Deschler, Serial No. 357,732 and Serial No. 357,720, filed May 26, 1989 and May 26, 1989, respectively. The following are preferred compounds:

SL 34-3-3 N-(triethoxysilylpropyl)-N'-butyl thiourea
SL 34-3-5 N-(triethoxysilylpropyl)-N'-propyl thiourea
SL 34-3-6 N-(triethoxysilylpropyl)-N'-cyclohexyl thiourea
SL 34-3-8 N-(triethoxysilylpropyl)-N'-dodecyl thiourea
SL 34-3-9 N-(triethoxysilylpropyl)-N',N'-dibutyl thiourea
SL 34-3-4 bis-(N,N'-triethoxysilylpropyl) thiourea
SL 34-2-6 N-(trimethoxysilylpropyl)-ethylene thiourea
SL 34-3-12 N-(triethoxysilylpropyl)-ethylene thiourea The other components of vulcanizable halogen rubber mixtures are known to persons skilled in the art.

Halogen rubbers which are useful for the present invention include e.g. halogenated butyl rubbers, especially brominated or chlorinated butyl rubbers, chlorinated rubbers, rubber hydrochlorides and preferably halogenated butyl rubbers and especially the polymers of 2-chlorobutadiene-1,3. Chlorosulfonated polyethylene can also be used. The silicatic fillers which can be used according to the invention, singly or in combination with each other, are fillers which are known in rubber technology. The concept "silicatic filler" is to be understood broadly and refers to fillers which consist of silicates, contain silicates and/or contain silicates which are chemically bound in the broadest sense, which fillers are compatible with rubbers and/or can be worked into rubber mixtures. Silicatic fillers include particularly the following:

(1) Highly disperse silicic acid fillers (silicon dioxide) with specific surfaces (BET surface measured with $N_2$) in a range of approximately 5 to 300, preferably 5 to 250 $m^2/g$ and with primary particle sizes in a range from approximately 10 to 400 nm which can be produced e.g.

by precipitation from solutions of silicates with inorganic acids, by hydrothermal decomposition, hydrolytic and/or oxidative high-temperature conversion of volatile silicon halogenides or by an electric arc process. These silicic acids can also be optionally present as mixed oxides or oxide mixtures with the oxides of metals such as aluminum, magnesium, calcium, barium, zinc, zirconium and/or titanium.

(2) Synthetic silicates, e.g. aluminum silicate or alkaline-earth silicates such as magnesium silicate or calcium silicate with specific surfaces of approximately 20 to 300 m$^2$/g and primary particle sizes of approximately 10 to 400 nm.

(3) Natural silcates, e.g. kaolines, argils, clays as well as natural silicic acids such as e.g. quartz and kieselguhr.

(4) Glass fibers and glass-fiber products such as mats, cords, fabrics, inserted matter and the like as well as microglass balls.

The following can be cited as filler mixtures: Silicic acid/kaolin or silicic acid/glass fibers/asbestos as well as blends of silicate-containing reinforcing fillers with the known rubber carbon blacks, e.g. silicic acid/ISAF carbon black or silicic acid/glass-fiber cord/HAF carbon black.

According to the present invention, the highly disperse or active silicic acids are preferred as silicatic fillers, especially the precipitated silicic acids and the latter preferably in amounts of 5 to 50 parts by weight, especially in relation to 100 parts by weight rubber.

Carbon black can be present in addition in the rubber mixtures of the invention, not only for coloring the vulcanizates grey or black, but also for achieving particular, valuable vulcanization qualities. The known rubber carbon blacks are preferred for this. Carbon black is used in the new rubber mixtures in amounts of up to 150 parts by weight, preferably 0.1–80 parts by weight relative to 100 parts by weight rubber.

When silicatic filler and carbon black are both present in the rubber mixtures, the entire filler content is limited to a maximum of 400 parts by weight relative to 100 parts by weight rubber. In the case of the exclusive usage of active silicic acid, 150 parts by weight can be considered as the upper limit.

Known stabilizing agents, especially those from the group of anti-aging agents, anti-fatigue agents, antioxidation agents, light-protection agents and antiozone agents as well as mixtures of the above can also present advantageously in the rubber mixtures of the invention, in amounts of 0.2 to 10 parts by weight relative to 100 parts by weight of the halogen rubber.

It can also be especially advantageous if the halogen rubber mixtures contain softeners or softener oils, e.g. highly aromatic naphthenic or paraffinic softener oils, advantageously those with low setting points of approximately between 0° and −60° C. The amount of softener oil can vary within wide limits—thus, it can be more than 0.5 or 5 parts by weight, especially more than 10 to approximately 100 parts by weight.

The halogen rubber mixtures according to the present invention preferably contain an organic acid which is solid at room temperature such as those used in rubber technology, in amounts of 0.2 to 10 parts by weight relative to 100 parts by weight rubber, preferably fatty acids such as stearic acid or corresponding acids of the same homologous series or benzoic acid or salicylic acid.

In addition, oxides of polyvalent metals such as those also used in rubber technology in amounts of 1–10 parts by weight relative to 100 parts by weight of rubber must be added to the rubber mixtures of the invention. These metal oxides include first and foremost zinc oxide, especially in a fine and/or active form. Moreover, magnesium oxide or optionally lead oxide can be used with good results. These oxides are preferably used in fine, active form or in powdery form. Mixtures of metal oxides can also be used.

In addition to the organyloxysilyl-functional thioureas, other accelerators can optionally be used.

Such accelerators include the compounds of the sulfenamide class such as e.g. benzothiazyl-2-cyclohexyl sulfenamide or guanidine derivatives such as e.g. diphenyl guanidine or di-ortho-tolyl guanidine and optionally sulfur. If they are used, a total of 0.5 to 2 phr of these additional accelerators are added.

In addition, the vulcanizable halogen rubber mixtures can also contain further conventional organosilane compounds such as e.g. of the type bis-(3-trialkoxysilyl-propyl)-tetrasulfide or of the corresponding sulfide and/or of the type $\omega$-halogen alkyltrialkoxysilanes, as has already been described in German Patent DE-PS No. 29 33 345 which corresponds to U.S. Pat. No. 4,278,587 in relation to other rubber mixtures, or also vinyl trialkoxysilanes or amino alkyltrialkoxysilanes.

The new halogen rubber mixtures are prepared in the following manner. A two-stage mixing cycle is preferred. The following components are mixed in the first stage in a kneading device at flowthrough temperatures between 55° and 65° C., preferably of 60° C.:

In the first minute, the rubber and the metal oxide, e.g., therefore, the polychlorobutadiene and the magnesium oxide; in the next one and one-half minutes, one-half of the silicatic filler and the remaining fillers are added; in the next one and one half minutes, the second half of the silicatic filler, the other organosilane compounds optionally provided, the softener, e.g. the softener oil and the remaining mixing components are added, with the exception of the organyloxysilyl-functional thioureas according to Formulas I or II and the zinc oxide; after a total of four and a half minutes the mixture is removed from the kneader.

In the second mixing stage the zinc oxide and the organyloxysilyl-functional thioureas, as well as any other accelerators optionally used, are added to the masterbatch from the first mixing stage on a roller pair at a flowthrough temperature of approximately 45° to 55° C., preferably of 50° C.

This two-stage mixing process avoids a premature scorching of the mixture.

Industrial applications for the rubber mixtures of the present invention and their vulcanizates are e.g.:

Industrial rubber articles such as cable jackets, hoses, heating hoses, drive belts, V-belts, conveyor belts, roller coatings, seals, electric insulations, jackets, impregnations and coatings of heat-resistant fabrics, damping elements and vibration elements and such articles which are required to have a high level of temperature and oil resistance.

DETAILED DESCRIPTION OF PREFERRED EMBODIMENTS

Exemplary formulations for halogen rubber mixtures according to the present invention are presented in the following examples with test results, including the cured (cross-linked) products, with evaluations and a comparison of these results.

Many different items are repeated therein, so that the following abbreviations are used.

TESTING PROCEDURES

The physical tests were performed at room temperature according to the following standard specifications:

| Tensile strength, | DIN 53504 measured in MPa |
| --- | --- |
| Tensile stress at a given elongation 100% | DIN 53504 measured in % |
| Tensile stress at a given elongation 200% | ASTM D 395, method B |
| Ultimate elongation | |
| Compression set measured in % | |

The following names and abbreviations are used in the examples of use, the meanings of which are indicated in the following:

| Baypren 210: | Polychloroprene rubber (polymerized 2-chloro-1,3-butadiene) |
| --- | --- |
| CORAX N 762: | Carbon black, BET surface 30 m$^2$/g (Degussa) |
| Ultrasil VN 3: | Fine, precipitated silicic acid, BET surface 175 m$^2$/g (Degussa) |

EXAMPLE 1

| | 1 | 2 | 3 | 4 | 5 |
| --- | --- | --- | --- | --- | --- |
| Baypren 210 | 100 | 100 | 100 | 100 | 100 |
| MgO, extra light | 4 | 4 | 4 | 4 | 4 |
| Stearic acid | 1 | 1 | 1 | 1 | 1 |
| CORAX N 762 | 30 | 20 | 20 | 20 | 20 |
| Ultrasil VN 3 | — | 10 | 10 | 10 | 10 |
| ZnO, RS | 5 | 5 | 5 | 5 | 5 |
| Dibutyl thiourea | 0.75 | 0.75 | — | — | — |
| SL 34-3-3 | — | — | 1.33 | — | — |
| SL 34-3-5 | — | — | — | 1.28 | — |
| SL 34-3-6 | — | — | — | — | 1.44 |
| Vulcanization: t$_{95}$ % at 170° C. | | | | | |
| Tensile strength MPa | 13.6 | 13.7 | 15.0 | 13.6 | 12.3 |
| Tensile stress at at given elongation 100% MPa | 2.1 | 2.0 | 2.1 | 2.3 | 2.1 |
| Tensile stress at at given elongation 200% MPa | 5.8 | 4.5 | 6.0 | 6.2 | 5.7 |
| Ultimate elongation % | 310 | 370 | 370 | 310 | 320 |
| Compression set method B, 22 h 70° C. | 6.1 | 6.6 | 7.2 | 6.0 | 5.6 |

Example 1 shows that the same vulcanization properties can be achieved by the use of SL 34-3-3, SL 34-3-5 and SL 34-3-6 in comparison to dibutyl thiourea when using 20 phr carbon black and 10 phr VN 3. A tendency to a higher tensile stress at a given elongation by the SL compounds can even be demonstrated.

Surprisingly, even the values of the dibutyl thiourea mixture with pure carbon-black filling are achieved with the SL compounds.

EXAMPLE 2

| | 6 | 7 | 8 | 9 | 10 |
| --- | --- | --- | --- | --- | --- |
| Baypren 210 | 100 | 100 | 100 | 100 | 100 |
| MgO, extra light | 4 | 4 | 4 | 4 | 4 |
| Stearic acid | 1 | 1 | 1 | 1 | 1 |
| CORAX N 762 | 30 | 20 | 20 | 20 | 20 |

-continued

| | 6 | 7 | 8 | 9 | 10 |
| --- | --- | --- | --- | --- | --- |
| Ultrasil VN 3 | — | 10 | 10 | 10 | 10 |
| ZnO, RS | 5 | 5 | 5 | 5 | 5 |
| Dibutyl thiourea | 0.75 | 0.75 | — | — | — |
| SL 34-3-8 | — | — | 1.79 | — | — |
| SL 34-3-9 | — | — | — | 1.56 | — |
| SL 34-3-4 | — | — | — | — | 1.94 |
| Vulcanization: t$_{95}$ % at 170° C. | | | | | |
| Tensile strength MPa | 13.6 | 13.9 | 12.8 | 16.0 | 8.5 |
| Tensile stress at a given elongation 100% MPa | 2.1 | 2.0 | 2.4 | 2.0 | 3.1 |
| Tensile stress at a given elongation 200% MPa | 5.8 | 4.5 | 6.7 | 5.5 | — |
| Ultimate elongation % | 310 | 375 | 280 | 410 | 190 |
| Compression set B | | | | | |
| 22 h 70° C. | 6.4 | 6.1 | 5.6 | 5.8 | — |
| 70 h 100° C. | 12.1 | 14.7 | 10.3 | 9.2 | — |

This example shows that SL 34-3-8, SL 34-3-9 and SL 34-3-4 in carbon black/silicic acid mixtures based on Baypren 210 yield properties analogous to dibutyl thiourea. Here too, the SL compounds with silicic acid achieve the properties of dibutyl thiourea with a pure carbon black filling.

EXAMPLE 3

| | 11 | 12 | 13 | 14 |
| --- | --- | --- | --- | --- |
| Baypren 210 | 100 | 100 | 100 | 100 |
| MgO, extra light | 4 | 4 | 4 | 4 |
| Stearic acid | 1 | 1 | 1 | 1 |
| CORAX N 762 | 30 | 20 | 20 | 20 |
| Ultrasil VN 3 | — | 10 | 10 | 10 |
| ZnO, RS | 5 | 5 | 5 | 5 |
| Ethylene thiourea | 0.75 | 0.75 | — | — |
| SL 34-2-6 | — | — | 1.95 | — |
| SL 34-3-12 | — | — | — | 2.25 |
| Vulcanization: t$_{95}$ % at 170° C. | | | | |
| Tensile strength MPa | 14.4 | 12.4 | 12.2 | 13.4 |
| Tensile stress at a given elongation 100% MPa | 2.8 | 2.5 | 2.6 | 2.8 |
| Tensile stress at a given elongation 200% MPa | 8.0 | 5.6 | 6.9 | 7.6 |
| Ultimate elongation % | 280 | 300 | 280 | 270 |
| Compression set B | | | | |
| 22 h 70° C. | 6.0 | 7.7 | 5.7 | 4.6 |
| 70 h 100° C. | 13.2 | 14.5 | 13.8 | 13.5 |

Even the two silylated ethylene thioureas SL 34-2-6, SL 34-3-12 exhibit the same property structure as the pure ethylene thiourea. The SL compounds exhibit the same property structure as ethylene thiourea added in pure carbon black mixtures even when using a carbon black/silicic acid blend.

What is claimed is:

1. In a vulcanizable rubber mixture containing at least one double band containing halogen rubber and a silicate filler;
   the improvement in which said mixture contains at least one substituted organyloxysilyl-functional thiourea of the general formula (I)

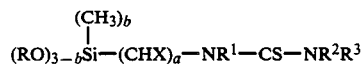

or of the general formula (II)

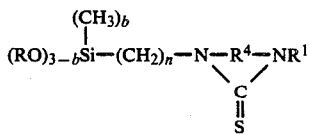

in an amount of 0.5–5.0 phr as accelerator, in which
a represents 1, 3, 4, 5 or 6
b represents 0, 1 or 2
R represents alkyl with 1 to 6 carbon atoms cycloalkyl with 5 to 7 carbon atoms aryl,
X represents hydrogen, if a =1, 3, 4, 5 or 6,
or X represents

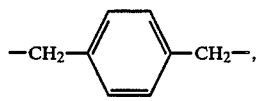

if a=1
$R^1$ represents hydrogen,

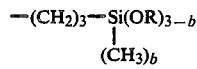

$R^2$ represents hydrogen alkyl with 1 to 8 carbon atoms, alkenyl with 1 to 8 carbon atoms, aryl,
$R^3$ which may be the same as or different from $R^2$ represents alkyl with 1 to 8 carbon atoms, alkenyl with 1 to 8 carbon atoms, aryl,
$R^4$ represents alkylene with 1 to 4 carbon atoms, arylene,
n represents a whole number from 1 to 6.

2. A vulcanizable rubber mixture as set forth in claim 1 in which R is phenyl and $R^2$ and $R^3$ from the group consisting of phenyl, naphthyl aralkyl, and phenethyl.

3. A vulcanizable rubber mixture as set forth in claim 1 in which the substituted organyloxysilyl-functional thiourea is selected from the group consisting of
N-(triethoxysilylpropyl)-N'-butyl thiourea,
N-(triethoxysilylpropyl)-N'-propyl thiourea,
N-(triethoxysilylpropyl)-N'-cyclohexyl thiourea,
N-(triethoxysilylpropyl)-N'-dodecyl thiourea,
N-(triethoxysilylpropyl)-N',N'-dibutyl thiourea, bis-(N,N'-triethoxysilylpropyl) thiourea,
N-(trimethoxysilylpropyl)-ethylene thiourea and
N-(triethoxysilylpropyl)-ethylene thiourea.

4. A vulcanizable rubber mixture as set forth in claim 1 in which the proportion of said substituted organyloxysilyl-functional thiourea is 0.5 to 5.0 parts by weight per hundred parts by weight of rubber.

5. A vulcanizable rubber mixture as set forth in claim 1 in which the halogen rubber is selected from the group consisting of chlorinated rubbers and rubber hydrochlorides.

6. A vulcanizable rubber mixture as set forth in claim 1 in which the halogen rubber is halogenated butyl rubber.

7. A vulcanizable rubber mixture as set forth in claim in which the halogenated butyl rubber is brominated butyl rubber or chlorinated butyl rubber.

8. A vulcanizable rubber mixture as set forth in claim in which the chlorinated butyl rubber is a polymer of 2-chlorobutadiene-1,3.

9. In a vulcanizable rubber mixture containing chlorosulfonated polyethylene and a silicate filler;
the improvement in which said mixture contains at least one substituted organyloxysilyl-functional thiourea of the general formula (I)

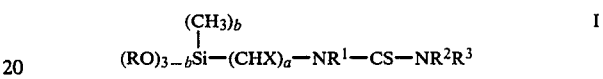

or of the general formula (II)

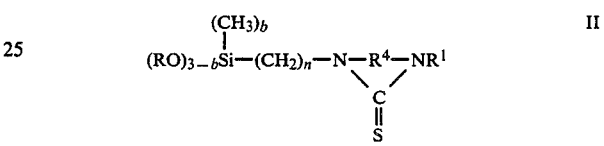

in an amount of 0.5–5.0 phr as accelerator, in which
a represents 1, 3, 4, 5 or 6
b represents 0, 1 or 2
R represents alkyl with 1 to 6 carbon atoms cycloalkyl with 5 to 7 carbon atoms,
x represents hydrogen, if a =1, 3, 4, 5 or 6,
or X represents

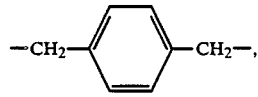

if a=1
$R^1$ represents hydrogen,

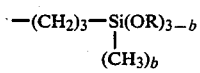

$R^2$ represents hydrogen
alkyl with 1 to 8 carbon atoms,
alkenyl with 1 to 8 carbon atoms, aryl
$R^3$ which may be the same as or different from $R^2$ represents alkyl with 1 to 8 carbon atoms,
alkenyl with 1 to 8 carbon atoms,
aryl,
$R^4$ represents alkylene with 1 to 4 carbon atoms, arylene,
n represents a whole number from 1 to 6.

* * * * *